Sept. 14, 1926.

C. J. HALL ET AL

MOLD FOR BOXES

Filed Oct. 4, 1924

WITNESSES:

INVENTORS
Charles J. Hall &
Benjamin J. Gudge
BY

ATTORNEY

Patented Sept. 14, 1926.

1,599,524

UNITED STATES PATENT OFFICE.

CHARLES J. HALL, OF WILKINSBURG, AND BENJAMIN J. GUDGE, OF FOREST HILLS, PENNSYLVANIA, ASSIGNORS TO WESTINGHOUSE ELECTRIC & MANUFACTURING COMPANY, A CORPORATION OF PENNSYLVANIA.

MOLD FOR BOXES.

Application filed October 4, 1924. Serial No. 741,619.

Our invention relates to a method of and an apparatus for molding composite containers, more particularly containers formed of layers of fibrous sheet material, impregnated or otherwise treated with a binder, such as the well known phenolic condensation products.

It is among the objects of our invention to provide means for molding containers of rectangular shape, which shall be simple and efficient and conducive to the manufacture of such containers in an expedient and inexpensive manner.

It is a further object of our invention to provide means for forming containers of the above-designated character which shall insure uniformity of quality and of shape and dimensions and the formation of little or no fin on the outside surface of the finished article.

Heretofore, there have been numerous means proposed for forming containers by molding, each of which embodied some particular form of mold by which the material utilized might be given the requisite pressure and the shape desired in the finished article.

The chief difficulty in the molding of composite containers is encountered in obtaining uniform pressure of the mold on the entire surface of the article being molded, which is essential to produce the desired surface finish and the requisite physical characteristics in the molded material.

Our invention is directed to a device for molding containers that provides uniform pressure on the bottom and side walls of the molded article and fully supports these members during the molding operation, which insures extreme accuracy in the contour and dimensions thereof.

We utilize the usual matrix, of the size and contour of the container to be molded, and also a plurality of pressure blocks, which are so disposed as to simultaneously compress the material within the matrix in all directions in which it has freedom of movement.

In the accompanying drawings constituting a part hereof and in which like reference characters designate like parts:

Figure 1:
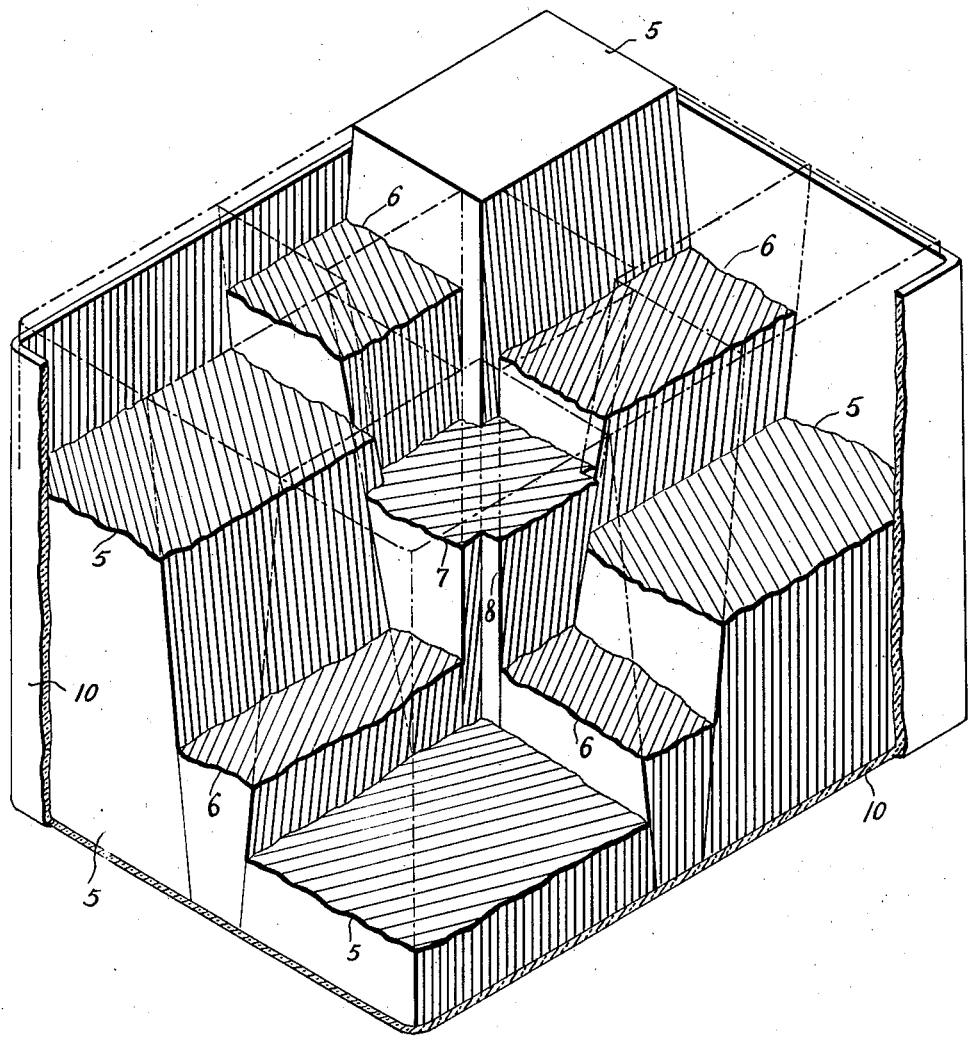
Figure 1 is a view, in perspective, of a device embodying the principles of our invention, which is utilized in molding containers.
Figure 2:
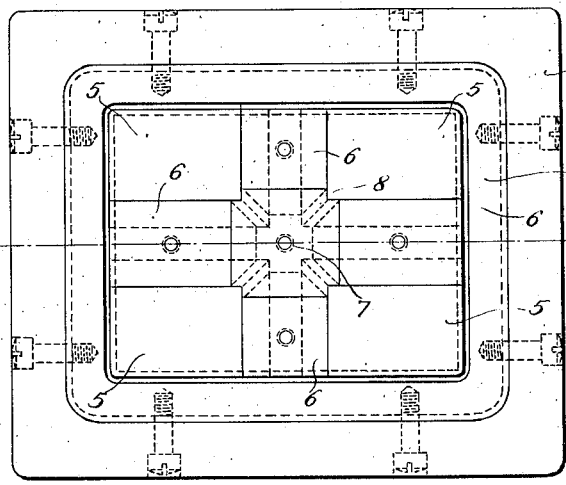
Fig. 2 is a plan view showing the complete mold utilized in practicing our invention.
Figure 3:
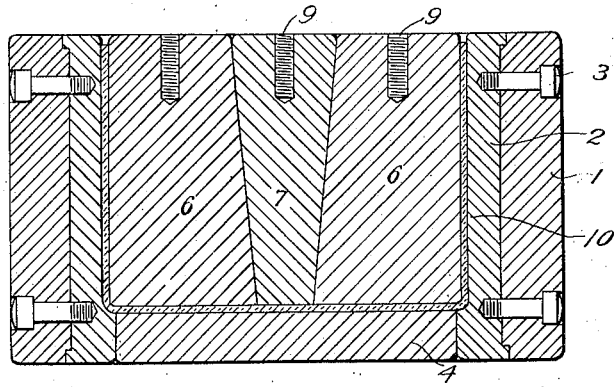
Fig. 3 is a cross-sectional view of the mold shown in Fig. 2, taken along the lines III—III of Fig. 2.

Referring to Figs. 2 and 3, the device therein illustrated comprises a casing 1, which is disposed around a matrix 2 and is secured thereto by screw bolts 3. A base plate 4 (Fig. 2) is disposed centrally of the matrix 2 at the bottom thereof, while a plurality of wedge-shaped pressure blocks, comprising four corner blocks 5, four side blocks 6 and a center block 7, are adapted to be disposed within said matrix.

The center block 7 is of inverted frustopyramidal shape and is provided with corner notches 8, which make it possible to shorten the side blocks 6 and prevent their interfering with each other during the operation of the mold. The notches 8 are adapted to engage the centrally extending corners of the blocks 5 to maintain alinement of the respective block members. The top portions of the blocks 6 and 7 are provided with screw holes 9 for receiving screws by means of which these blocks may be withdrawn from the mold. Such action permits the collapse of the remaining blocks, which may thereafter be readily lifted out of the matrix.

Figure 4:
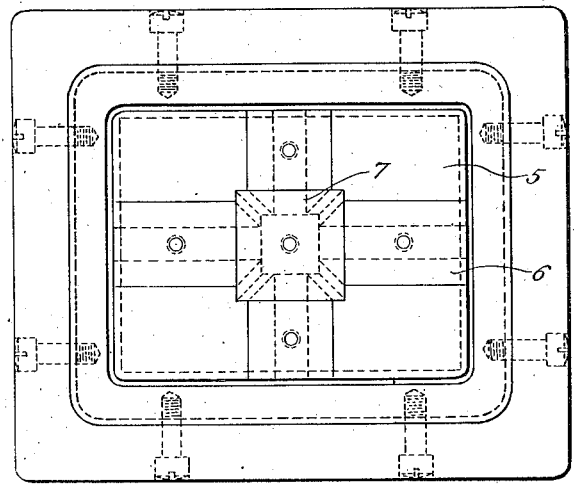
Fig. 4 is a plan view showing a modification of the mold illustrated in Fig. 2.

In Fig. 4, the corner blocks 5 are notched at their central or innermost corners to engage the corners of the inverted pyramidal center block 7 for the same purpose as the notches in the blocks 7 of Fig. 2. This construction also makes it possible to shorten the side blocks 6 and to prevent their interfering with each other during the operation of the mold.

The mold is utilized in the following manner: the material 10 to be molded is disposed within the matrix of the mold as shown in Fig. 3. The substance utilized is preferably laminated sheet material, of a fibrous nature and impregnated with a binder, such as a phenolic condensation product, which material is preformed in the shape shown in Fig. 3. The pressure blocks are assembled within the material 10 by first placing the corner blocks 5, then the side blocks 6 and lastly the center block 7, which initially projects above the other blocks.

The assembled mold is then disposed between a pair of heatable platens of a hydraulic press, heat and pressure are applied, and the center block 7 is forced downwardly, which brings pressure to bear on the side and corner blocks until the top of the center block 7 becomes level with the top faces of the other blocks and of the matrix, when the mold is in its closed position. During the application of the pressure on the center block 7 and subsequently on the other blocks 5 and 6, a substantially uniform pressure is exerted against the entire inner surface of the molded composition or material 10, which results in a container of uniform cross section and dimensions. After the material is sufficiently cured, the mold is removed from the press, and the molded article is removed from the matrix by first lifting the center block 7 (by means of a suitable screw bolt, as previously mentioned), and, subsequently, the side blocks and the corner blocks 5, after which the article may be pushed out of the matrix by means of the base plate 4.

The mold is then ready for another charge and the operation is repeated.

It is evident from the foregoing description of our invention that the device for molding containers described therein comprises a simple, efficient and inexpensive means for manufacturing molded containers of uniform quality and size.

Although we have described a specific embodiment of our invention, it will be obvious to those skilled in the art that various modifications may be made in the details of construction, the size and proportions of the several co-operating parts and the manner of utilizing the device without departing from the principles herein set forth.

We claim as our invention:

1. A mold comprising a matrix, a base plate therefor and a plurality of pressure blocks disposed therein and adapted to exert uniform pressure on the sides and bottom of said matrix and plate.

2. A mold comprising a rectangular matrix, a base plate therefor and a plurality of pressure blocks of wedge shape disposed therein and adapted to exert uniform pressure on the sides and bottom of said matrix and plate.

3. A mold comprising a rectangular matrix, a base plate therefor and a plurality of pressure blocks disposed therein and adapted to exert uniform pressure on the sides and bottom of said matrix and plate, said pressure blocks having inclined faces.

4. A mold comprising a rectangular matrix, a base plate therefor and a plurality of pressure blocks adapted to co-operate with said matrix and base plate, said blocks comprising a plurality of corner blocks and side blocks and a center block adapted to co-operatively engage said corner and side blocks.

5. A mold comprising a rectangular matrix, a base plate therefor and a plurality of pressure blocks adapted to co-operate with said matrix and base plate, said blocks comprising a plurality of corner blocks and side blocks, and a center block adapted to co-operatively engage said corner and side blocks, said blocks having inclined faces on their co-operating sides.

6. A mold comprising a rectangular matrix, a base plate therefor and a plurality of pressure blocks adapted to co-operate with said matrix and base plate, said blocks comprising a plurality of corner blocks and side blocks, and a center block adapted to co-operatively engage said corner and side blocks, said blocks having inclined faces on their co-operating sides and parallel faces on their work-engaging sides.

7. A method of forming composite containers which comprises providing a plurality of layers of fibrous sheet material impregnated with a binder, superposing said treated layers in the matrix of a mold, disposing a plurality of wedge blocks on said layers and simultaneously applying heat to said matrix and pressure to said blocks to effect a uniform distribution of heat and pressure to the sides and bottom of said matrix to consolidate said layers.

In testimony whereof, we have hereunto subscribed our names this first day of October, 1924.

CHARLES J. HALL.
BENJAMIN J. GUDGE.